Figure 1:
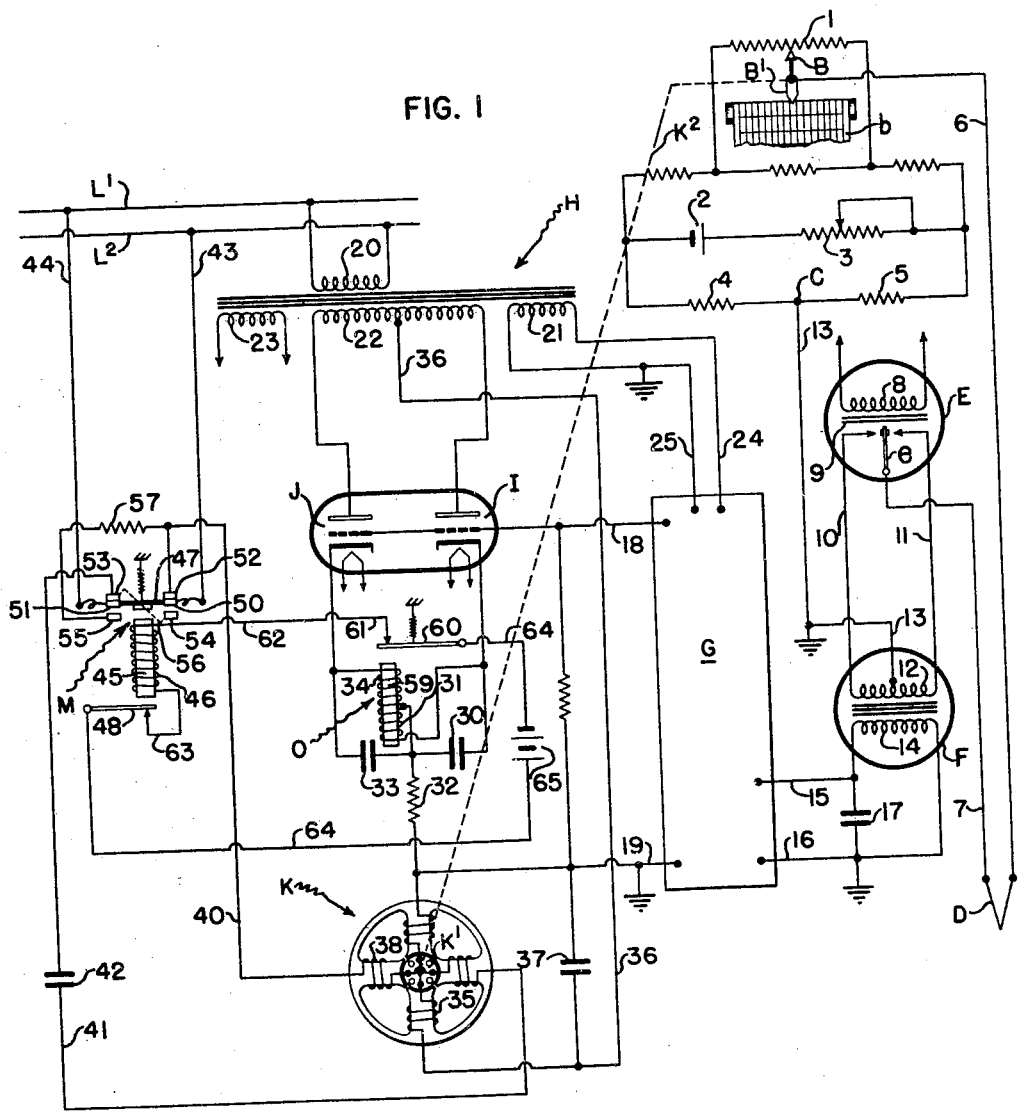

July 13, 1948.  L. B. CHERRY  2,445,289
INDUCTION MOTOR DAMPING SYSTEM
Filed Dec. 4, 1946  2 Sheets-Sheet 1

INVENTOR.
LLOYD B. CHERRY
BY Arthur H. Swanson
ATTORNEY

July 13, 1948.    L. B. CHERRY    2,445,289
INDUCTION MOTOR DAMPING SYSTEM
Filed Dec. 4, 1946    2 Sheets—Sheet 2

INVENTOR.
LLOYD B. CHERRY
BY Arthur H. Swanson
ATTORNEY

Patented July 13, 1948

2,445,289

UNITED STATES PATENT OFFICE 2,445,289

INDUCTION MOTOR DAMPING SYSTEM

Lloyd B. Cherry, Beaumont, Tex., assignor to The Brown Instrument Company, Philadelphia, Pa., a corporation of Pennsylvania Application December 4, 1946, Serial No. 713,953

10 Claims. (Cl. 318—209)

The present invention relates to reversible alternating current motors adapted for use as control or relay motors, and of the well known type in which a rotating magnetic field is created by the conjoint use of separately energized power and control winding of the motor, and in which the operation of the motor is controlled by establishing, interrupting and varying the phase of the current flowing in the control winding.

Extensive use is made of such motors in self-balancing measuring apparatus, to rebalance the apparatus when unbalanced by changes in the values of the quantities measured. In such use of a motor of the above mentioned type, the motor is ordinarily started and stopped at frequent intervals, and is operated when started, during periods of varying duration as required to eliminate the existing unbalance of the measuring apparatus. For the efficient use of such rebalancing motors, it is essential, or at least highly desirable that in completing each rebalancing operation the motor should be stopped at the precise instant at which balance is attained. A long recognized difficulty experienced in such motor use, is the tendency of the motor to coast, or continue to turn as a result of inertia following the interruption of the effective energizing current flow in the control winding of the motor. Overtravel of the motor due to coasting, must be followed by at least one reverse operation of the motor to obtain balance, and when provisions are made for interrupting the control winding current shortly before balance is obtained, the rebalancing operation will frequently be inadequate. Such inadequacy results in a significant and undesirable neutral or dead zone between the zones at the opposite sides of the dead zone in which rebalancing operations are carried out.

The general object of the present invention is to provide a motor of the above mentioned type with simple and effective means for producing a motor damping effect by modifying the character of the current flowing in the power winding of the motor. More specifically, the object of the present invention is to provide means for producing a motor damping change in the current flow in the power winding of the motor in automatic response to a predetermined change in the character of the current flow in the control winding of the motor.

A still more specific object of the invention is to provide a motor of the above mentioned type with simple and effective means through which a predetermined change in the character of the current flow in the control winding of the motor will rapidly shift the phase of the current flowing in the power winding of the motor alternately in opposite directions, relative to the phase of the alternating voltage source of said current.

The differences in character between the currents flowing in the power and control windings of a motor of the above-mentioned type, result in significant differences between the motor damping results obtainable with the present invention and those obtainable with previously proposed damping arrangements, including, in particular, arrangements proposed for obtaining damping effects by modifying the character of the current flow in the control winding of a rebalancing motor, as rebalancing operations of the motor approach completion.

The various features of novelty which characterize my invention are pointed out with particularity in the claims annexed to, and forming a part of this specification. For a better understanding of the invention, however, its advantages, and specific objects attained by its use, reference should be had to the accompanying drawing and descriptive matter in which I have illustrated and described preferred embodiments of the invention.

Figure 2:
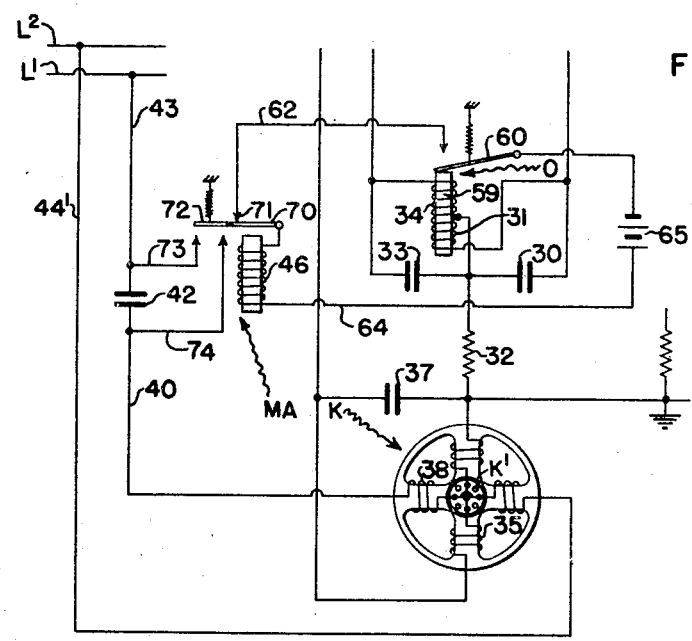
Figure 3:
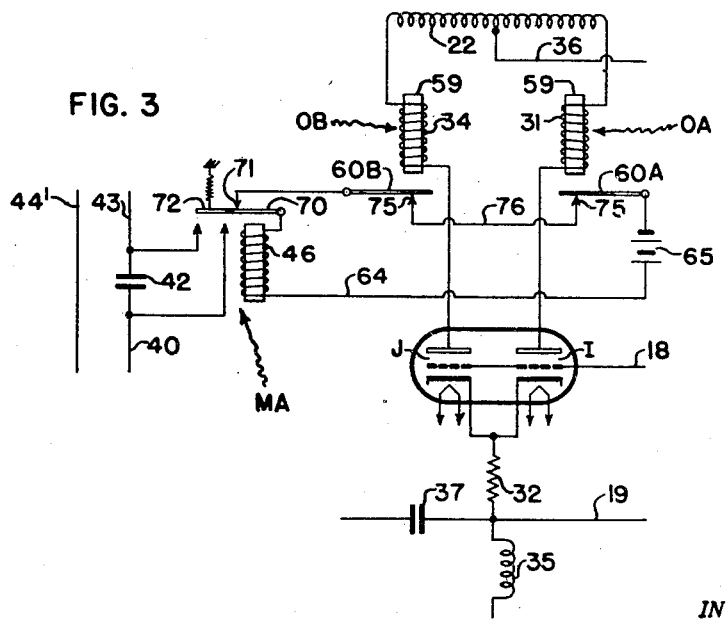

Of the drawings:

Fig. 1 is a circuit diagram illustrating the use of one embodiment of the present invention in a rebalancing potentiometric measuring apparatus; and Figs. 2 and 3 are diagrams each disclosing a different modification of the motor damping apparatus illustrated in Fig. 1.

The use of the present invention in a conversion type, self-balancing, potentiometer, which is now in extensive use in this country, is diagrammatically illustrated in Fig. 1. In such measuring apparatus the unidirectional current flow in the circuit branch including the thermocouple whose temperature is being measured, is converted into a pulsating current of predetermined frequency, and that pulsating current is utilized in a transformer element of the apparatus to produce an alternating current rebalancing signal proportional in magnitude to the unidirectional direct current, and of one phase, or of a second phase displaced from said one phase by 180°, accordingly as the apparatus is unbalanced in one direction or in the opposite direction.

The measuring apparatus shown in Fig. 1 includes a measuring circuit in the form of a conventional split potentiometer comprising three branches, each of which is connected at each end to the corresponding end of each of the other two branches. One of said branches includes a slide wire resistance 1. Another of said branches includes a circuit energizing battery 2 and a calibrating resistance 3, and the third branch includes two resistances 4 and 5. The slide wire resistance 1 is engaged by a slider contact B, adjustable along the resistance 1, in accordance with variations in the quantity measured, by a rebalancing motor as hereinafter described. Mechanically connected to the contact B for adjustment with the latter is a stylus or recording element B' adapted to record the varying values of the quantity measured on a traveling record chart $b$.

The thermocouple D whose voltage is to be measured, is connected between the slide wire resistance point engaged by the contact B, and a stationary point C in the third branch of the potentiometer circuit between the resistances 4 and 5. One terminal of the thermocouple D is directly connected to the contact B by a conductor 6. The second thermocouple terminal is connected to the point C by conducting elements included in and associated with a vibrator element E and transformer element F.

The elements E and F collectively form the conversion portion of the apparatus. As shown, the second terminal of the thermocouple D is connected by a conductor 7 to the vibrating armature or reed $e$ of the element E. The reed $e$ vibrates with a frequency equal to the frequency of the alternating current supplied to the winding 8 included in the element E, which operates in conjunction with an electromagnetic core body 9 to maintain the reed $e$ in vibration with the described frequency. The vibrating reed $e$ alternately engages stationary contacts at its opposite sides. One of the stationary contacts is connected by a conductor 10 to one end, and the other contact is connected by a conductor 11 to the second end of an inductive winding 12 included in the element F. A center tap conductor 13 connects the midpoint of the winding 12 to the potentiometer point C. Unidirectional current flowing through the circuit branch including the thermocouple D and conductors 6 and 7, is converted by the vibratory action of the reed $e$ into current pulses flowing alternately into the opposite end portions of the winding 12 through the conductors 10 and 11. The current pulses thus passing into the winding 12 at its opposite ends pass away from the winding 12 through the center tap conductor 13. The oppositely directed current pulses flowing alternately through the two halves of the winding 12 to the conductor 13, induce an alternating current flow in the secondary winding 14 of the transformer element F. The terminals 15 and 16 of the winding 14 are connected by a condenser 17 and are connected to the input terminals of an electronic voltage amplifier G. The terminal 16 of the winding 14 is connected to ground.

The voltage amplifier G has output conductors 18 and 19, the output conductor 19 being connected to ground, and is energized by alternating current supplied by the secondary winding 21 of a transformer H. The latter has a primary winding 20, and has two secondary windings, 22 and 23, in addition to the winding 21. The transformer primary winding 20 is connected to supply conductors L' and L² which supply alternating current of commercial frequency and voltage, ordinarily 60 cycles per second, and 115 volts. The terminals of the winding 21 are connected by conductors 24 and 25 to the energizing terminals of the amplifier G, the conductor 25 being connected to ground. The amplifier G amplifies the alternating current signal impressed on it through the conductors 15 and 16, and impresses the amplified signal on the common input circuit of two motor drive triode valves I and J. For its intended purpose the amplifier G may take various forms. In the extensively used conversion type potentiometer, the voltage amplifier section corresponding to the amplifier G, includes three resistance-capacity coupled triodes, and a fourth triode which operates as a diode rectifier to supply unidirectional current to the anodes of the voltage amplifying valves.

The motor drive triode valves I and J are shown as enclosed in a common envelope or twin tube. The anode of the valve I is directly connected to one end of the transformer secondary winding 22. The anode of the valve J is connected to the other end of that winding. The alternating voltages impressed on the anodes of the valves I and J are of the same frequency as the alternating current signal impressed on the amplifier G by the transformer secondary winding 14, and the phase relations of said voltages and signals are definitely related as hereinafter described, in consequence of the fact that the vibrator winding 8 is energized by the supply conductors through the secondary winding 23 of the transformer H. The winding 23 is customarily employed also to supply current to the cathode heaters of the electronic valves I and J and the electronic valves, not shown, but included in the amplifier G.

The control grids of the valves I and J are each connected to the output terminal 18 of the voltage amplifier G. The cathode of the valve I is connected to the grounded amplifier terminal 19 through a condenser 30, a relay winding 31 in parallel with the condenser 30, and a biasing resistance 32 in series with the condenser 30 and winding 31. The cathode of the valve J is connected to the grounded output terminal 19 of the amplifier G by a condenser 33, a relay winding 34 in parallel therewith and the previously mentioned biasing resistance 32, which is connected in series with the condenser 33 and winding 34 as well as in series with the condenser 30 and the winding 31. The resistance 32 thus provides cathode bias for each of the valves I and J.

The valves I and J supply energizing currents to the control winding 35 of a reversible electric rebalancing motor K. One terminal of the winding 35 is connected to the end of the biasing resistance 32 which is connected to the output terminal 19 of the amplifier G. The other terminal of the winding 35 is connected by a conductor 36 to the midpoint of the transformer secondary winding 22. The terminals of the control winding 35 are connected by a condenser 37.

The motor K also includes a power winding 38 which is energized by the alternating current supply conductors L' and L². In accordance with, and for the purposes of the present invention, the terminals 40 and 41 of the power winding 38 are connected to the supply conductors L' and L² through a reversing switch M. The latter is biased to a normal position in which the terminal 40 of the winding 38 is connected by the switch M to a conductor 43 which is a branch of the supply conductor L². The terminal 41 of the winding 38 includes a condenser 42 and is connected to the supply conductor L' through a branch 44 from the latter and the switch M when the latter is is in its normal or biased position. When the switch M is moved from its biased position into a second position it connects the power winding terminal 40 to the conductor 44 and thereby to the supply conductor L', and connects the power winding terminal 41 to the conductor 43 and thereby to the supply conductor L².

As diagrammatically shown in Fig. 1, the switch M comprises an electromagnet having a core 45, a winding 46 surrounding the core, and armatures 47 and 48, one at each end of the core. Each armature is biased for movement away from the core and is moved toward the core when the winding 46 is energized. The electromagnet core 45, winding 46, armature 48 and associated energizing conductors collectively form an intermittently operating device commonly called a buzzer or Ruhmkorff coil.

The armature 47 carries contacts 50 and 51 which are insulated from one another and are connected as through flexible leads to the supply conductor branches 43 and 44, respectively. When the coil 46 is deenergized and the armature 47 occupies its biased position, the movable switch contacts 50 and 51 engage stationary contacts 52 and 53, respectively. When the coil 46 is energized, the movable contacts 50 and 51 engage the stationary switch contacts 54 and 55, respectively. The contact 52 is directly connected to the terminal 40 of the winding 38 and the contact 53 is directly connected through the condenser 42 to the terminal 41 of that winding. The stationary contact 54 is connected indirectly to the terminal 41 by a conductor 56 shown as a dotted-line in Fig. 1, which connects the stationary contacts 53 and 54. The stationary contact 55 is connected to the power winding terminal 40, advantageously through a resistance 57.

The energization of the winding 46 which controls the position of the armature member 47 of the switch mechanism M, is controlled by a differential relay O, of which the windings 31 and 34 are elements. Each of these windings surrounds one end of a core 59. The windings are so arranged that when similarly energized, each substantially neutralizes the tendency of the other to attract an armature 60, and pull the latter out of the position shown in Fig. 1 to which it is biased. In the position shown in Fig. 1, the armature 60 engages a contact 61. The latter is connected by a conductor 62 to one terminal of the switch energizing winding 46. The second terminal of the winding 46 terminates in a contact 63 which is engaged by the armature 48 when the winding 46 is deenergized. When the winding 46 is energized, the armature 48 moves out of engagement with the contact 63. The armature 48 is connected to the differential relay armature 60 by a conductor 64 which includes a battery 65 or other source of current for energizing the winding 46.

The motor K comprises a rotor K' which may be of squirrel-cage type and rotates in one direction or the other, according to the direction of rotation of the revolving magnetic field created by the control winding 35 and power winding 38, when both windings are operatively energized. The rotation of the rotor K' operates through the diagrammatically illustrated mechanical connection K², to adjust the slider contact B along the slide wire 1 in the direction required to rebalance the measuring circuit following a change in the voltage of the thermocouple D which unbalances that circuit. In the normal operating condition of the apparatus the differential relay O is energized and the winding 46 is deenergized.

Except for the motor damping action obtained as hereinafter described by the action of the reversing switch M under the control of the differential relay O, the general operation of the apparatus shown in Fig. 1 is well known and may be briefly summarized as follows: In any period of steady operation the contact B will engage the slide wire 1 at the point of the latter which differs in potential from the network point C by an amount equal in magnitude and opposite in direction to the voltage of the thermocouple D. The position of the recorder element B' then indicates on the scale chart b the value of the quantity measured, and records that value on the chart b.

On a change in the thermocouple temperature the thermocouple voltage acquires a value different from the potential drop between the contact B and point C, thereby unbalancing the network and causing a current to flow through the thermocouple between the contact B and point C. That current is divided into pulses in the vibrator E and the passage of successive pulses alternately between the opposite ends of the winding 12 and the center tap conductor 13 induces an alternating current signal in the secondary winding 14 of the transformer element F. The frequency of the induced current is the same as the frequency of the voltage between the conductors L' and L², since it depends on the frequency of the current flowing in the winding 8 of the vibrator E and that current is supplied by the transformer secondary 23.

The alternating current signal produced by the winding 14 is proportional in magnitude to the unidirectional current flow through the thermocouple, and is approximately in phase with or 180° out of phase with the voltage between the conductors L' and L² accordingly as the current flowing through the thermocouple E is in one direction or in the opposite direction. The direction of that current flow depends, of course, upon whether the flow results from an increase or a decrease in the thermocouple temperature.

The signal impressed on the amplifier G by the transformer winding 14, after amplification in the amplifier G, is impressed on the common input circuit terminals of the motor drive valves I and J, and thereby creates current flow in the control winding 35. That current flow cooperates with the current flow in the power winding 38 to create a magnetic field which revolves, and causes the motor rotor K' to revolve, in one direction, or the opposite direction depending upon the direction of current flow through the thermocouple D.

With anode voltage supplied to the output circuits of the valves I and J by the secondary winding 22 of the transformer H, as shown, the anodes of the two valves are rendered positive with respect to the center tap conductor 36 during alternate half cycles of the voltage alternations across the terminals of the winding 22. The valves I and J are thus arranged to conduct during alternate half cycles of the alternating current supplied by the supply conductors L' and L².

When no signal is impressed on the control electrodes of the valves I and J, pulsating unidirectional currents of twice the frequency of the alternating voltage supplied by the conductors L' and L², are impressed on the motor winding 35. Those currents do not tend to cause rotation of the motor in either direction. When an alternating current signal is impressed on the control electrodes of the valves I and J, the magnitude of the pulses of current flowing in the anode circuit of one of the valves will be increased, while the magnitude of the pulses of current flowing in the anode circuit of the other valve will be decreased. Whether the pulses of unidirectional current supplied to the motor winding 35 during the first half cycle of each alternation will predominate over, or be predominated over, by the unidirectional pulses supplied to the winding 35 during the second half cycle of each alternation, depends on the phase of the signal impressed on and amplified in the amplifier G, and determines the direction of motor rotation.

During each period in which an amplified signal of significant value is being impressed on the control grids of the valves I and J, the current flow in the control winding 35 will cooperate with the current flow in the power winding 38 to produce a rotating magnetic field and thereby cause a corresponding rotation of the rotor K' in one direction or the other, depending upon the phase relation of the signal to the voltage across the supply conductors L' and L².

Since the apparatus shown in Fig. 1 does not differ from the well known conversion type potentiometer now in extensive use in this country, except by its inclusion of the elements O and M, further explanations of its general operation under conditions in which the device M is not energized, appear to be unnecessary. The said conversion type potentiometer is disclosed and claimed in the pending application of Walter P. Wills, Ser. No. 421,173, filed December 1, 1941, which issued as Patent No. 2,423,540 on July 8, 1947, and a form of said potentiometer is also disclosed in the Wills Patent No. 2,385,481, of September 25, 1945.

As the balanced condition of the measuring network shown in Fig. 1 is being approached during the final portion of each rebalancing operation of the motor K, the amplitudes of the current pulsations passing to the winding 35 from the cathodes of the valves I and J, respectively, approach equality. During periods in which the unidirectional pulses passing to the winding 35 from the cathode of one or the other the valves I and J predominate significantly over the pulses passing to the winding from the cathode of the other valve, the relay O is operatively energized, and the armature contact 60 is held out of engagement with the stationary contact 61. As equality of the pulses from the two valves is attained, or approximated so that the difference between the current pulses of the two valves is reduced to a predetermined small amount, the differential relay O is deenergized.

The deenergization of the relay O energizes the buzzer winding 46 and attracts the armatures 47 and 48. When attracted, the armature 47 pulls the contacts 50 and 51 out of their normal engagement with the contacts 52 and 53, respectively, and causes the contacts 50 and 51 to engage the contacts 54 and 55, respectively. The effect of this is to reverse the connections between the terminals of the power winding 38 and the supply conductors L' and L². The attraction of the armature 48 by the magnetic core 45 of the buzzer deenergizes the winding 46, and thereby causes the contacts 50 and 51 to separate from the contacts 54 and 55 and reengage the contacts 52 and 53, respectively. The momentary energization of the winding 46 is rapidly repeated during each period in which the differential relay O remains deenergized. The frequency with which the winding 46 is alternately energized and deenergized while the relay O is deenergized, is not critical, but may well be substantially in excess of the frequency of alternation of the voltage across the supply conductors L' and L².

Each momentary energization of the winding 46 of the electromagnetic switch M, and resultant movement of the contacts 50 and 51, reverses the connection between the power winding 38 and supply conductors L' and L². Such momentary reversal of the power current flow through the winding 38 tends to reverse the direction of rotation of the magnetic field of the motor K, and subjects the latter to a positive and relatively strong damping action. The fact that the power current flowing through the winding 38 is not reduced, as balance is approached, contributes to the positive and reliable character of the damping action produced.

Each reversal of the energizing connections to the winding 38 produced by the energization of the buzzer winding 46, shifts the phase of the power current through an angle of approximately 180° relative to the phase of the voltage across supply conductors L' and L². An effective motor damping action can be obtained, however, by a substantially small shift of the power current phase. Thus, an effective damping action can be secured with the arrangement shown in Fig. 2 for intermittently short-circuiting the condenser 42 included in the energizing circuit of the power winding 38. The effect of intermittently short-circuiting the condenser 42 is to shift the phase of the power current through the winding 38 back and forth through an angle of approximately 90°. The effect of the phase shift produced each time the condenser 42 is short-circuited, is to subject the rotor K' to a positive drag or retarding effect.

In the arrangement shown in Fig. 2 the reversing switch M of Fig. 1 is replaced by a short-circuiting switch MA intermittently energized as is the switch M. The buzzer winding 46 of the switch MA of Fig. 2 is intermittently connected between its energizing conductors 62 and 64 during each period in which the differential relay O is deenergized, exactly as in Fig. 1. As shown in Fig. 2, however, the conductor 64 is permanently connected to one terminal of the winding 46 and the other terminal of that winding is connected to an armature 70 which is biased into the position in which it engages a contact 71 connected to the conductor 62, and is pulled out of engagement with that contact when the winding 46 is energized. The armature 70 differs from the armature 48 of Fig. 1 in that it gives movement to an insulated bridging contact 72. The latter is moved into the position in which it connects two short-circuiting conductors 73 and 74 when the buzzer winding 46 is energized. When that winding is deenergized, the armature 70 is moved by the bias force acting on it into the position in which it engages the contact 71 connected to the conductor 62 and disconnects the short-circuiting conductors 73 and 74. The conductor 73 is connected to one terminal, and the conductor 74 is connected to the other terminal of the condenser 42.

As shown in Fig. 2, the last mentioned terminal of the condenser 42 is connected by conductor 40 to one terminal of the winding 38, and the other terminal of the condenser is connected to the supply conductor L' by the conductor 43. In Fig. 2 the second terminal of the winding 38 is permanently connected to the supply conductor L² by a conductor 44'. As will be apparent, the deenergization of the differential relay O of Fig. 2 results in an intermittent energization of the buzzer winding 46, as in Fig. 1. The energization and deenergization of the buzzer winding 46 produces a rapidly repeated phase shift of the current in the winding 38, first in one direction and then in the opposite direction, in Fig. 2 as in Fig. 1. In Fig. 2, however, the phase shift is approximately 90° instead of approximately 180°, but the smaller phase shift insures a positive and suitably strong braking action.

The differential relay O shown in Fig. 1 and in Fig. 2 may be replaced by two separate relays or electromagnetic switches OA and OB, as shown in Fig. 3, which are so connected to the buzzer winding 46 and energizing voltage source 65, as to permit energization of the buzzer winding 46 only when both relays OA and OB are deenergized. As shown in Fig. 3, the relays OA and OB include windings 31 and 34 which surround the corresponding magnetic cores of the relays and are respectively included in the anode circuits of the valves I and J. The relays OA and OB have individual armatures 60A 60B, respectively. Each of said armatures is biased to a position in which it engages a contact 75 connected to the corresponding end of a conductor 76 which thus connects the two armatures when both relays OA and OB are deenergized. As shown, the armature 60A is connected to one terminal of the battery 65 and the armature 60B is connected to the contact 71 of the short circuiting switch MA of Fig. 3, which as shown is exactly like the short circuiting switch MA of Fig. 2. The second terminal of the battery 65 is directly connected to one terminal of the buzzer winding 46 through a conductor 64 as in Fig. 2.

As will be apparent, the operation of the apparatus shown in Fig. 3 is substantially the same as that of the apparatus shown in Fig. 2. The deenergization of the differential relay O is directly dependent upon the substantial equality in the amplitudes of the currents flowing to the windings 31 and 34, and such equality is obtained only when the components of the currents having the supply current frequency approximate their zero values. Such equality is also necessary to the simultaneous deenergization of the relays OA and OB of Fig. 3. In Fig. 3 the relay windings 31 and 34 are respectively connected between the anodes of the valves I and J and the corresponding end of the transformer winding 22, instead of being connected between the cathodes of the valves and the common cathode biasing resistance 32 as they are in Fig. 1. This does not constitute a significant difference between the Fig. 3 and the Fig. 1 or 2 arrangements. Either arrangement of the windings 31 and 34 may be used in the Fig. 1, Fig. 2 or Fig. 3 form of the invention.

As will be apparent, when the device including means, such as the differential relay O of Figs. 1 and 2, or the relays OA and OB of Fig. 3, which is responsive to the character of current flow in the control winding, is arranged to actuate the phase shifting device M or MA as the speed of the motor K is reduced but before a rebalancing operation is completed, the motor damping shifts of the power winding current phase alternately in opposite directions, permit the motor to complete the rebalancing operation with suitable dispatch and without risk of motor overtravel.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. An alternating current motor comprising in combination a rotor, a power winding, a control winding, first energizing circuit connections arranged to maintain an alternating current flow of predetermined frequency and phase in said power winding, second energizing circuit connections arranged to maintain an alternating current flow in the control winding which is of the same frequency as, and normally differs in phase from the current supplied to the power winding by the first mentioned connections so that the currents flowing in the two windings create a revolving magnetic field which rotates said rotor, means for varying the character of the current flow in the control winding to vary the motor operation, and a motor damping mechanism comprising a current modifying device associated with said first energizing circuit connections and operative when actuated to modify the current supplied to the power winding, and comprising a control device responsive to the character of the current flow in the control winding and arranged to actuate said current modifying device to thereby produce an effect tending to interrupt the motor operation when the current flow in the control winding attains a predetermined character.

2. An alternating current motor combination as specified in claim 1, in which the currents normally maintained in the power and control windings of the motor normally differ approximately 90° in phase, and in which said current varying means is operable to shift the phase of current flowing in said control winding about 180° to thereby vary the direction of the motor rotation.

3. An alternating current motor combination as specified in claim 1, in which the current normally maintained in the power and control windings of the motor differ approximately 90° in phase, and in which said current modifying device is operable to shift the phase of the current flowing in said power winding approximately 180°.

4. An alternating current motor combination as specified in claim 1, in which currents normally maintained in the power and control windings of the motor differ approximately 90° in phase, and in which said current modifying device is operable to shift the phase of the current flowing in said power winding approximately 90°.

5. In alternating current motor combination as specified in claim 1, in which said second energizing connections include the input circuits of two electronic valves respectively supplied with anode currents approximately 180° out of phase with one another, and in which the amplitudes of the anode currents of the two valves may be inversely varied to vary the speed and direction of rotation of the motor, and in which said control device comprises a separate energizing winding in each of the two anode circuits.

6. An alternating current motor combination as specified in claim 1, in which said current modifying device is a reversing switch including a Ruhmkorff coil arranged to rapidly oscillate said switch alternately in opposite directions.

7. An alternating current motor combination as specified in claim 1, in which said first energizing connections include a condenser and in which said current modifying device is operable to alternately establish and interrupt a short-circuiting connection between the terminals of said condenser.

8. An alternating current motor combination as specified in claim 1, in which said first energizing connections include a condenser, and in which said current modifying device is an electromagnetic switch operable, when energized, to establish and interrupt a short-circuiting connection between the terminals of said condenser in rapid alternation.

9. In a reversible alternating current motor of the known type comprising a rotor, a control field winding and a power field winding operative to create a magnetic field rotating in one direction on the opposite direction depending on the phase relation of alternating currents flowing through said windings, circuit connections including a condenser and arranged to normally connect a source of alternating voltage to said power winding for the passage therethrough of a power current leading said voltage in phase by approximately 90°, and means responsive to a control condition for simultaneously passing through said control winding two control currents of amplitudes varying with changes in said condition and of the same frequency as said voltage and one of which is approximately in phase with, and the other of which is approximately 180° out of phase with said voltage, the improved motor damping means comprising a device responsive to the values of said two control currents, and means actuated by said device to adjust said circuit connections and thereby shift the phase of the power current relative to the phase of said voltage on the attainment of a predetermined value of said control condition when the two control currents attain predetermined values.

10. An alternating current motor comprising in combination a rotor, a power winding, a control winding, first energizing circuit connections arranged to maintain an alternating current flow of predetermined frequency and phase in said power winding, second energizing circuit connections arranged to maintain an alternating current flow in the control winding which is of the same frequency as, and normally differs in phase from the current supplied to the power winding by the first mentioned connections so that the currents flowing in the two windings create a revolving magnetic field which rotates said rotor, means for varying the character of the current flow in the control winding to vary the motor speed, said motor including a motor damping mechanism comprising a phase shifting device associated with said first energizing connections and operative when actuated to shift the phase of the current supplied to the power winding, and comprising a control device responsive to the character of the current flow in the control winding and arranged to actuate said phase shifting device to shift the phase of the power winding current and thereby produce a motor damping effect when the current flow in the control winding attains a predetermined character.

LLOYD B. CHERRY.

Certificate of Correction

Patent No. 2,445,289. July 13, 1948.

LLOYD B. CHERRY

It is hereby certified that errors appear in the printed specification of the above numbered patent requiring correction as follows: Column 10, line 57, claim 3, for the word "current" read *currents*; column 11, lines 37 and 38, claim 9, strike out "leading said voltage in phase by approximately 90°" and insert instead *which is substantially in phase with said voltage*; column 12, lines 2 and 3, same claim, strike out "is approximately in phase with" and insert *leads said voltage by approximately 90°*; lines 3 and 4 same claim 9, strike out "is approximately 180° out of phase with said voltage" and insert *lags said voltage by approximately 90°*; and that the said Letters Patent should be read with these corrections therein that the same may conform to the record of the case in the Patent Office.

Signed and sealed this 28th day of September, A. D. 1948.

[SEAL]

THOMAS F. MURPHY,
*Assistant Commissioner of Patents.*